May 5, 1936.   J. J. McGERRY   2,039,546
COMBINATION SPECULUM SURGICAL INSTRUMENT
Filed March 10, 1934     2 Sheets-Sheet 1
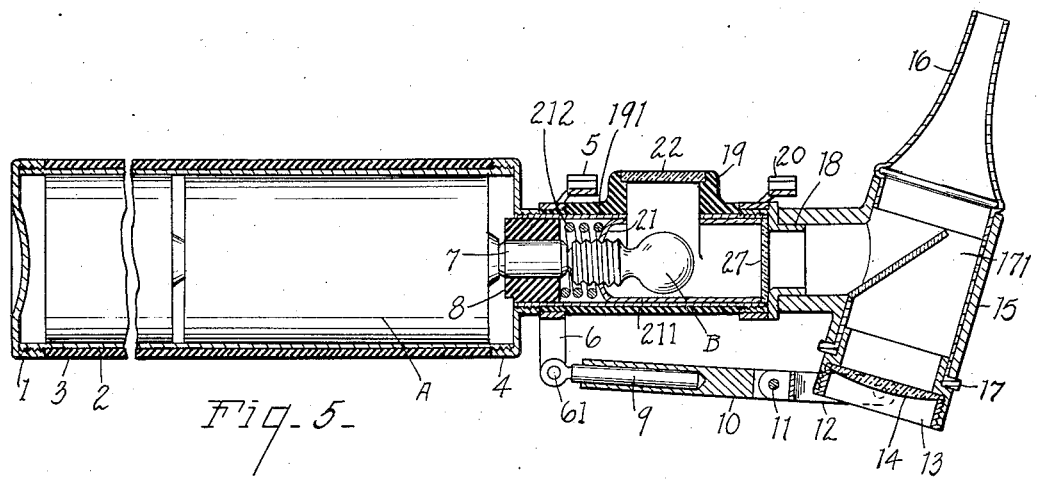
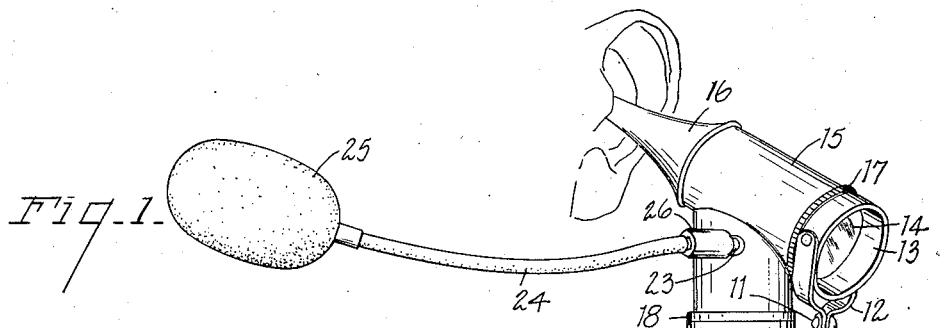
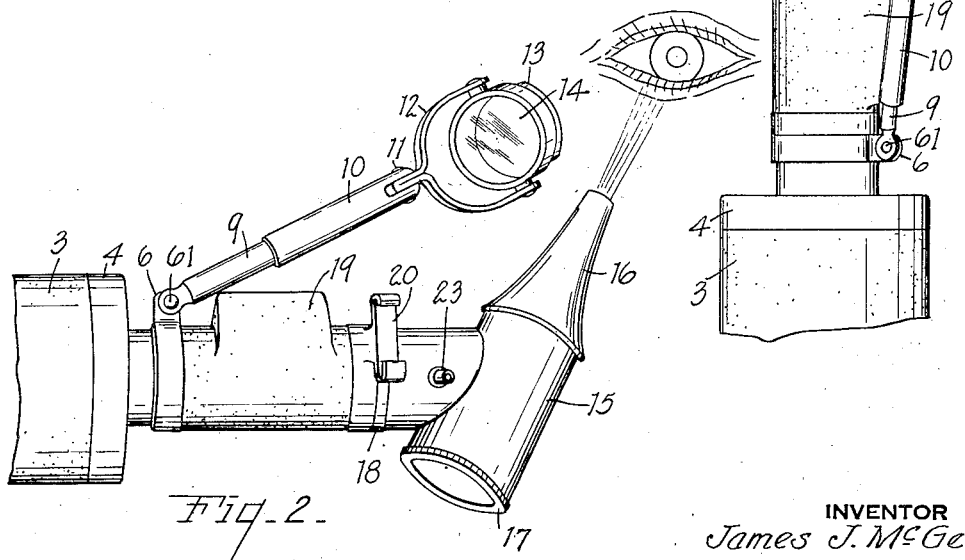
INVENTOR
James J. McGerry
BY
Chappell Earl
ATTORNEYS May 5, 1936.  J. J. McGERRY  2,039,546

COMBINATION SPECULUM SURGICAL INSTRUMENT

Filed March 10, 1934    2 Sheets-Sheet 2

INVENTOR
James J. McGerry
BY
ATTORNEYS

Patented May 5, 1936

2,039,546

UNITED STATES PATENT OFFICE 2,039,546

COMBINATION SPECULUM SURGICAL INSTRUMENT

James J. McGerry, East Grand Rapids, Mich., assignor to McKelly-Ward Corporation, Grand Rapids, Mich.

Application March 10, 1934, Serial No. 714,921

3 Claims. (Cl. 128—9)

The objects of the invention are:

First, to provide a very compact speculum instrument with a special effective illumination for use as an otoscope or the like.

Second, to provide such a structure which may be effectively used as a speculum for making examinations generally.

Third, to provide such a structure in which there is ample clearance for instrumentation inside the ear or similar cavity.

Fourth, to provide such a structure with a magnifier which can be very effectively used for illumination and examination of the eye or any other part.

Fifth, to provide such a structure in which there is especially effective control of the volume of the illumination without the use of regulation by rheostats or the like.

Sixth, to provide such a structure with an especially effective illuminated field for making microscopic examination.

Seventh, to provide such a structure in which a tongue depressor or similar device can be readily made use of in connection with the effective illumination and adjustable support for magnifying glass in connection.

Eighth, to provide for effective warming of the air in such a massage instrument.

Ninth, to provide an effective lamp bulb support and means for such an instrument.

Objects relating to details and economies of my invention will definitely appear from the description to follow. The invention is defined in the claims.

A preferred embodiment of my invention is illustrated in the accompanying drawings, in which:

Fig. 1 is a perspective view of one form of my combination instrument complete for examination of the ear cavity or the like.

Fig. 2 is a perspective view with the illumination means and the lens adjusted for inspecting the eye or other surface.

Fig. 5 is an enlarged detail longitudinal central section view through a preferred form (somewhat modified) of structure adjusted for ear examination and massage, the tongue depressor being removed from its support.

The parts will be identified by their numerals of reference which are the same in all the views.

A is a dry cell battery of the usual construction and B is a usual construction of miniature lamp bulb for use in such instruments. When the speculum head is removed a long cylindrical bulb 10 can be inserted for its special use.

Figure 3:
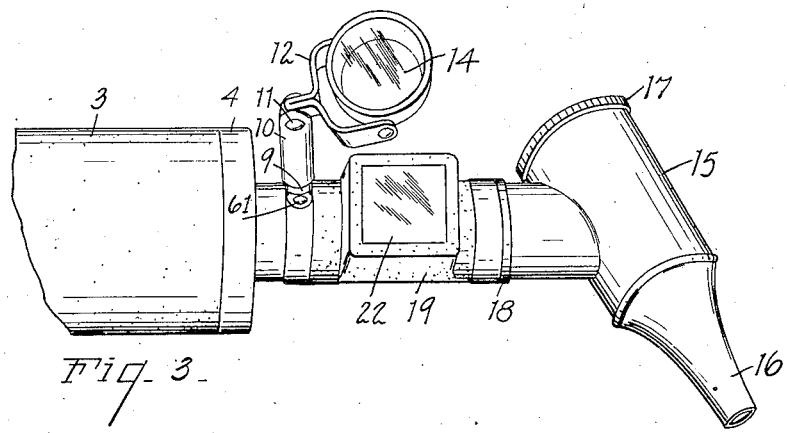
Fig. 3 shows the combination instrument with the lens adjusted for inspection of any object on the illuminated field or support.
Figure 4:
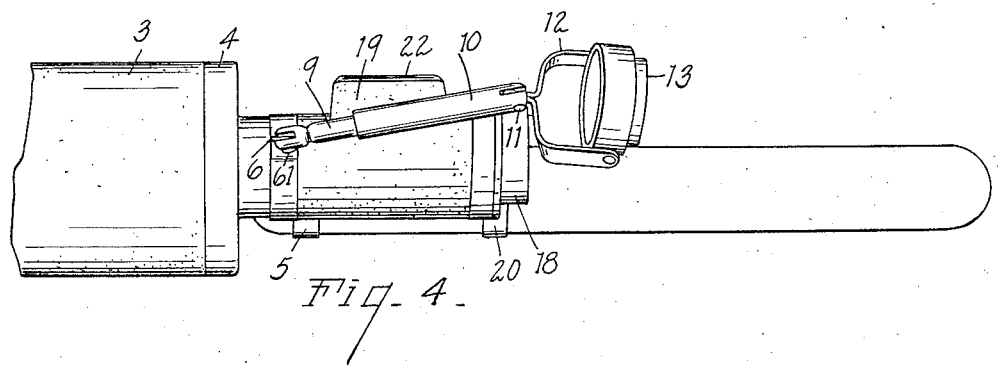
Fig. 4 is a perspective view with the speculum head removed and the tongue depressor or other instrument inserted with the lens adjusted for inspection.
Figure 6:
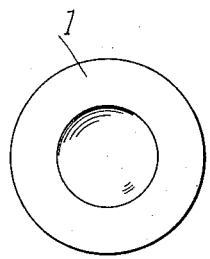
Fig. 6 is an end view of the case taken from the left hand end of Fig. 5.
Figure 7:
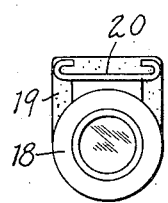
Fig. 7 is a detail end view of the structure with the speculum head detached.

The battery case surface is the handle for the instrument. 1 is the battery case head and cap screw threaded in position. 2 is the inner battery shell tube or case receiving the battery case cap. 3 is the outer battery case of bakelite or other suitable insulating material. 4 is the battery case head adapter screw threaded onto the upper end of the inner battery case 2. 5 is a rear depressor clasp supported on a friction ring which surrounds and is rotatable on the adapter. 6 is a lateral bracket on the clasp carrying a joint ring pin 61 which pivotally supports the telescope adjusted arm. 7 is a battery contact pin and 8 is the insulating bushing for said pin. 9 is the male member of the telescopic adjusting arm which is pivoted on the joint pin 61 to the said bracket 6. 10 is the female member of the telescopic adjusting arm. This is bifurcated at its upper end. 11 is the cross joint pin extending transversely through the bifurcated arms. 12 is the pivoted fork for carrying the lens. 13 is the lens retainer ring pivoted between the arms of the fork 12. 14 is the lens supported in the retainer ring 13. 15 is the speculum head, cylindrical, see Fig. 5, or conical, see Figs. 1 to 3, in form. 16 is the adjustable speculum carried by said head. This is removable and any required form can be inserted.

17 is the dimming reflector adjustable in the said head. This is of hollow cylindrical or conical form flattened obliquely on one side with an aperture 171 affording opportunity for inspection through the lens or with the lens removed affording opportunity for instrumentation through the speculum. The beveled side of the dimming reflector is a polished mirror and by shifting its angle by rotation on its axis varying amounts of light are reflected through the speculum without interfering with the inspection or manipulation. The lens retainer ring fits the cylindrical end of the head 15 air tight for a purpose hereinafter to be explained.

18 is a head adapter for connection to a lateral hollow neck on the head. 19 is the lamp case with a window on the side on which the adapter 18 is carried. 20 is the front depressor clasp having a ring which surrounds the lamp case 19 making it revolubly adjustable thereon.

21 is a specially constructed light bulb socket apertured at its sides to permit ready manipulation of the bulb in inserting it in the lamp. 21 I is the inner light case tube which fits within the main tube 19 and is likewise slotted to facilitate manipulation. 22 is the white translucent glass for the window in the light case 19.

23 is an inlet aperture for an air hose connection. 24 is the air hose. 25 is the bulb. 26 is a heater element preferably a heater coil in proximity to the inlet aperture to heat the air that is forced in by the said bulb to avoid any unpleasant effect from the introduction of cold air. There is inserted also a transparent disk 27 which closes with an air-tight joint across the adapter 18.

When the structure is adjusted as indicated in Fig. 5, the instrument is in position for inspecting the ear. With the lens closed to the position there shown, the joint is air tight.

When this is done, by the manipulation of the bulb already described, massaging can occur or conditions of dilation or contraction can be induced to facilitate inspection and permit manipulation of the drum to show whether or not there was any fixation of the bones of the ear, or whether perforation of the drum has occurred.

I have shown my improved speculum surgical instrument in the forms preferred by me. It is clear that the devices shown are all served by the lamp. Complete inspection, so far as it is possible by such an instrument is secured, which is of special assistance for diagnosis by ear, eye and throat specialists. The same is available for much further and other use than that.

I wish to claim the structure in the particular form shown and also in its particular adaptation to the different instruments and uses. The invention is defined specifically and broadly in the appended claims.

Having thus described my invention, what I claim as new and desire to secure by Letters Patent is:

1. In a combination speculum surgical instrument, a battery and case adapted for use as a handle, a lamp case supported at one end of said battery by a suitable adapter and having a translucent window at one side to serve as a microscope inspection object holder, adjusting rings on said lamp case and adapter having tongue depressor clasps thereon, a bracket on one ring, a pivoted telescopic arm carried by the said bracket, a lens fork pivoted to said arm, a casing for the lens, a speculum head having an adapter for connecting to the said lamp case, a removable adjustable speculum for said head with a joint adapted to receive said lens case, an air tight transparent partition in the said head adapter, an adjustable open-ended shell within the said speculum head having an oblique flattened side adapted to serve as a reflector to project light through the speculum whereby the part under investigation can be examined through the lens through the said speculum and the lens may be withdrawn for instrumentation, an aperture in the said speculum head with connections to an air bulb, and an electric heater coil opposite the said aperture.

2. In a combination speculum surgical instrument, a battery and case adapted for use as a handle, a lamp case supported at one end of said battery by a suitable adapter, a bracket on a ring, a pivoted telescopic arm carried by the said bracket, a lens fork pivoted to said arm, a casing for the lens, a speculum head having an adapter for connecting to the said lamp case, a removable adjustable speculum for said head with a joint adapted to receive said lens case, an adjustable open-ended shell within the said speculum head having an oblique flattened side adapted to serve as a reflector to project light through the speculum whereby the part under investigation can be examined through the lens through the said speculum and the lens may be withdrawn for instrumentation.

3. In a diagnostic instrument of the character set forth, the combination of a tubular lamp case having cylindrical adapters at its ends for removably connecting a handle and speculum, respectively, the lamp case having a side wall opening provided with a flange constituting a window frame, and a translucent pane mounted in said frame, rotatable end rings on said lamp case having tongue depressor clasps thereon, a lens adapted for selective use with said pane and the speculum, and means connecting said lens to one of said end rings for universal adjustment.

JAMES J. McGERRY.